United States Patent
Minemura et al.

(10) Patent No.: US 10,672,275 B2
(45) Date of Patent: Jun. 2, 2020

(54) VEHICLE CONTROL DEVICE AND VEHICLE CONTROL METHOD

(71) Applicant: DENSO CORPORATION, Kariya, Aichi-pref. (JP)

(72) Inventors: Akitoshi Minemura, Kariya (JP); Yosuke Ito, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 372 days.

(21) Appl. No.: 15/576,537

(22) PCT Filed: May 11, 2016

(86) PCT No.: PCT/JP2016/063954
§ 371 (c)(1),
(2) Date: Nov. 22, 2017

(87) PCT Pub. No.: WO2016/190099
PCT Pub. Date: Dec. 1, 2016

(65) Prior Publication Data
US 2018/0151073 A1    May 31, 2018

(30) Foreign Application Priority Data
May 27, 2015    (JP) .................................. 2015-107902

(51) Int. Cl.
*G08G 1/16* (2006.01)
*B60K 31/00* (2006.01)
(Continued)

(52) U.S. Cl.
CPC .......... *G08G 1/164* (2013.01); *B60K 31/0008* (2013.01); *B60R 21/0134* (2013.01);
(Continued)

(58) Field of Classification Search
CPC .... G08G 1/164; G08G 1/166; B60K 31/0008; B60R 21/0134; B60T 7/22; B60T 7/12;
(Continued)

(56) References Cited

U.S. PATENT DOCUMENTS

| | | |
|---|---|---|
| 2004/0246167 A1 | 12/2004 | Kumon et al. |
| 2014/0205144 A1 | 7/2014 | Inada |
| 2015/0206435 A1 | 7/2015 | Ouchi |

FOREIGN PATENT DOCUMENTS

| | | |
|---|---|---|
| JP | H06-36197 | 2/1994 |
| JP | 2007-248480 A | 9/2007 |

(Continued)

*Primary Examiner* — Khoi H Tran
*Assistant Examiner* — Jonathan J Pitts
(74) *Attorney, Agent, or Firm* — Knobbe, Martens, Olson & Bear, LLP (57) ABSTRACT

A vehicle control device obtains, a relative distance of an object to an own vehicle in the travel direction of the own vehicle and a lateral position that is a relative location of the object to the own vehicle in a lateral direction orthogonal to the travel direction. The vehicle control device sets a limit value indicating the lateral width of a determination region for determining whether or not the object is present in the traveling path of the own vehicle. The vehicle control device determines, on the basis of the lateral position of the object and the limit value for the determination region, whether or not the object is present in the traveling path of the own vehicle. The vehicle control device extends the determination region width by correcting the limit value when the object is a vehicle and the relative distance is less than a predetermined distance.

24 Claims, 5 Drawing Sheets

(51) Int. Cl.
*B60T 7/22* (2006.01)
*B60W 30/09* (2012.01)
*B60R 21/0134* (2006.01)
*G01S 13/93* (2020.01)
*G01S 13/931* (2020.01)
*B60T 7/12* (2006.01)

(52) U.S. Cl.
CPC .............. *B60T 7/22* (2013.01); *B60W 30/09* (2013.01); *G01S 13/93* (2013.01); *G01S 13/931* (2013.01); *G08G 1/166* (2013.01); *B60T 7/12* (2013.01); *B60T 2201/024* (2013.01)

(58) Field of Classification Search
CPC .. B60T 2201/024; B60W 30/09; G01S 13/93; G01S 13/931
See application file for complete search history.

(56) References Cited

FOREIGN PATENT DOCUMENTS

| | | |
|---|---|---|
| JP | 2011-191237 A | 9/2011 |
| JP | 2014-139756 A | 7/2014 |
| JP | 2014-142202 A | 8/2014 |
| WO | 2014-033954 A1 | 3/2014 |

VEHICLE CONTROL DEVICE AND VEHICLE CONTROL METHOD

CROSS-REFERENCE TO RELATED APPLICATION

This application is based on and claims the benefit of priority from earlier Japanese Patent Application No. 2015-107902 filed on May 27, 2015, the description of which is incorporated herein by reference.

TECHNICAL FIELD

The present disclosure relates to vehicle control techniques in which whether or not an object is present in the traveling path of an own vehicle is determined and the vehicle is controlled on the basis of the result of the determination.

BACKGROUND ART

Conventionally, there is a pre-crash safety (PCS) system for reducing or preventing damage due to collision with an own vehicle and objects such as other vehicles, pedestrians, and road structures located ahead of the own vehicle in the travel direction thereof. In the PCS system, time to collision (TTC), which is estimated time for the own vehicle to collide with an object, is calculated on the basis of the relative distance between the own vehicle and the object and the relative speed or the relative acceleration between the own vehicle and the object. Subsequently, on the basis of the calculated time to collision, the PCS system alerts the driver of the own vehicle of an approach by a warning device, etc., or actuates the braking device of the own vehicle, for example.

Examples of the PCS system include a vehicle control device disclosed in Patent Literature (PTL) 1. The vehicle control device disclosed in PTL 1 detects the location of an object by a radar device and determines, using a motion vector of the object based on the result of the detection, whether or not an own vehicle is likely to collide with the object.

CITATION LIST

Patent Literature

[PTL 1] JP 2014-139756 A

SUMMARY OF THE INVENTION

Technical Problem

When the location of another vehicle is detected by the radar device, etc., there are lateral variations in the points of reflection of radar waves from another vehicle because the other vehicle has a lateral width (vehicle width) greater than or equal to a predetermined value. Therefore, the determination of whether or not another vehicle is present in the traveling path of the own vehicle is unstable (the accuracy of the determination decreases). Accordingly, an actuation failure may occur, causing a situation in which a safety device is not actuated even though the safety device needs to be actuated (when there is a risk of collision) when another vehicle is actually present in the traveling path of the own vehicle (i.e., not actuated when needed). On the other hand, when reducing occurrence of the actuation failure of the safety device, unnecessary actuation may occur, causing a situation in which the safety device is actuated even though the safety device does not need to be actuated (when there is no risk of collision) (i.e., actuated when not needed).

An object of the present disclosure is to provide a vehicle control device capable of detecting the location of an object by a radar device and accurately determining whether or not the object is present in the traveling path of an own vehicle, and provide a vehicle control method performed by the vehicle control device.

Solution to Problem

A vehicle control device in the present disclosure obtains, from a radar device that transmits radar waves ahead of an own vehicle in a travel direction thereof and receives reflected waves that are waves reflected by an object, sensing information of the object based on the reflected wave, and includes an object information acquisition unit, a type determination unit, and a presence determination unit. The object information acquisition unit obtains, on the basis of the sensing information, a relative distance of the object to the own vehicle in a travel direction of the own vehicle and a lateral position that is a relative location of the object to the own vehicle in a lateral direction orthogonal to the travel direction of the own vehicle. The type determination unit determines whether or not the object is a vehicle; a limit value setting unit which sets a limit value indicating a determination region width in the lateral direction orthogonal to the travel direction of the own vehicle, for a determination region for determining whether or not the object is present in a traveling path of the own vehicle. The presence determination unit determines, on the basis of the lateral position and the limit value, whether or not the object is present in the traveling path of the own vehicle, The limit value setting unit performs an extension process of extending the determination region width by correcting the limit value to a larger value when the object is a vehicle and the relative distance is less than a predetermined distance.

In the abovementioned configuration, when the object is a vehicle, the limit value for the determination region for determining whether or not the object is present in the traveling path of the own vehicle is increased so that the determination region width is extended (the process of extending the determination region width is performed). Thus, with the vehicle control device in the present disclosure, the presence of the object in the traveling path of the own vehicle is easily determined even when there are variations in the lateral position of the object which is detected by the radar device. On the other hand, when the relative distance of the object to the own vehicle is long (when they are at a long distance), there is no need to perform control to avoid collision between the own vehicle and the object. Therefore, in the case where the limit value for the determination region is corrected to a larger value (extension correction) so that the object can be easily determined as being present in the traveling path of the own vehicle, there is a possibility that the presence of the object is determined more than necessary (excessively). Thus, in the abovementioned configuration, the process of extending the determination region width is performed when the relative distance of the object to the own vehicle is short and there is a need to perform control to avoid collision between the own vehicle and the object (when there is a need to make the presence of the object be easily determined). Accordingly, the vehicle control device in the present disclosure can accurately determine whether or not the object is present in the traveling path of the own vehicle.

DESCRIPTION OF THE EMBODIMENTS

Embodiments will be described below with reference to the drawings. Note that the same or equivalent parts throughout the following embodiments share the same reference signs in the drawings, and the same description applies to the parts denoted by the same reference signs.

<First Embodiment>

A vehicle control device according to the present embodiment is mounted on a vehicle (own vehicle) and detects an object present around the own vehicle, for example, ahead of the own vehicle in a travel direction thereof. Subsequently, the vehicle control device performs control to avoid collision between the detected object and the own vehicle or reduce damage due to a collision. In this way, the vehicle control device according to the present embodiment functions as a PCS system.

Figure 1:
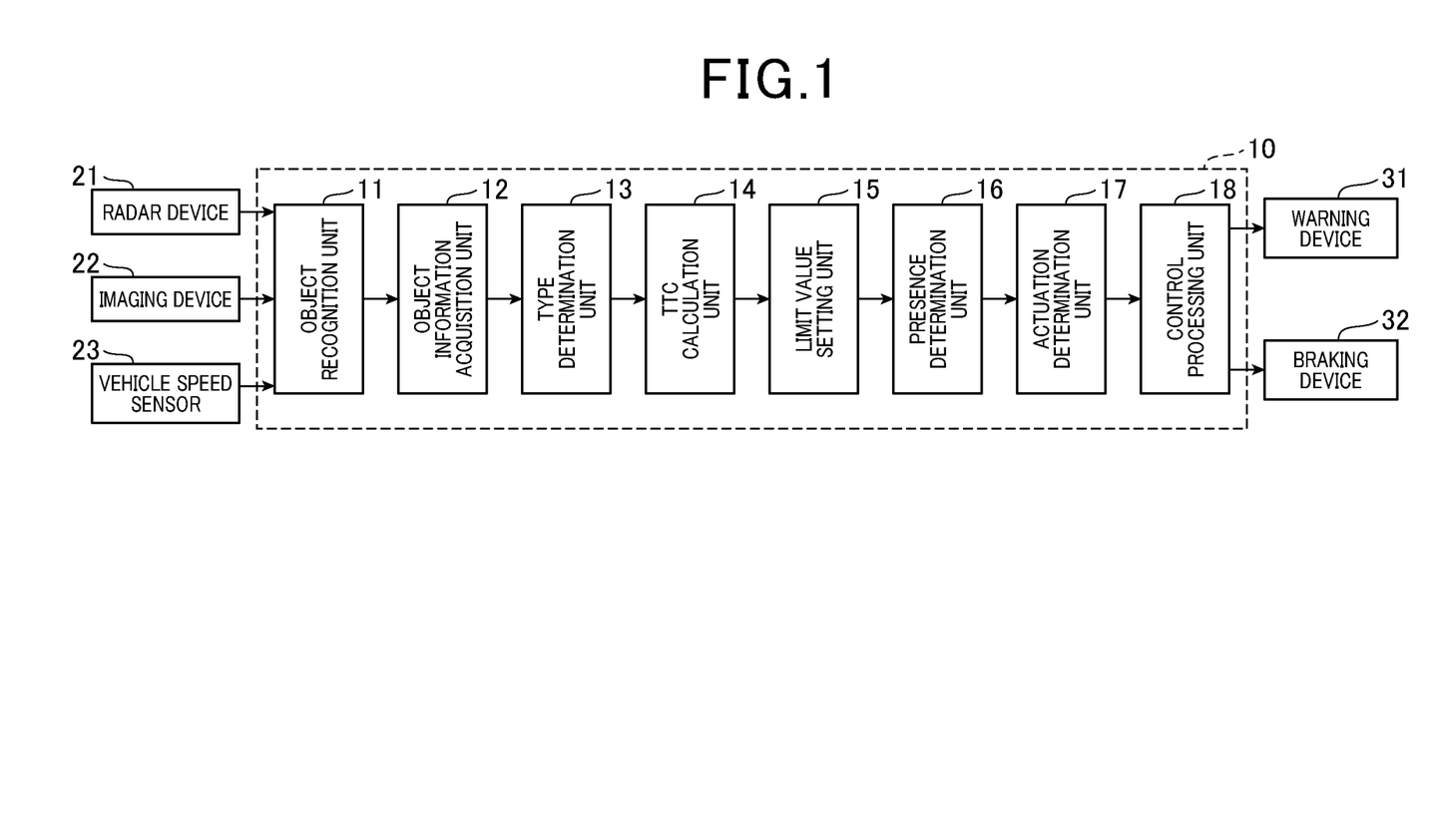
FIG. 1 is a configuration diagram of a vehicle control device according to the first embodiment.

FIG. 1 is a configuration diagram of a vehicle control device according to the present embodiment. As illustrated in FIG. 1, a driver-assistance electronic control unit (ECU) 10 which is the vehicle control device according to the present embodiment is a computer including a central processing unit (CPU), memory such as read-only memory (ROM) and random-access memory (RAM), an input/output (I/O) device, and so on. The driver-assistance ECU 10 includes the following functions: an object recognition unit 11; an object information acquisition unit 12; a type determination unit 13; a TTC calculation unit 14; a limit value setting unit 15; a presence determination unit 16; an actuation determination unit 17; and a control processing unit 18. The driver-assistance ECU 10 implements the functions by the CPU executing a program installed, for example, in the ROM.

A sensor device which inputs various sensing information is connected to the driver-assistance ECU 10. Examples of the sensor device to be connected include a radar device 21, an imaging device 22, and a vehicle speed sensor 23.

The radar device 21 is, for example, a millimeter-wave radar which transmits a high-frequency signal in a millimeter-wave band as radar waves. The radar device 21 is provided at a front end of the own vehicle. The radar device 21 defines, as an object sensitive region, a region spreading over a predetermined angle range, and detects the location of an object within the object sensitive region. Specifically, the radar device 21 transmits the radar waves on a predetermined control cycle and receives reflected waves by a plurality of antennas. Subsequently, on the basis of a point in time when the radar waves are transmitted and a point in time when the reflected waves are received, the radar device 21 calculates the distance to the object that has reflected the radar waves. The frequency of the reflected waves from the object changes due to the Doppler effect. Therefore, on the basis of the changed frequency, the radar device 21 calculates a relative speed to the object that has reflected the radar waves. Furthermore, on the basis of a phase difference of the reflected waves received by the plurality of antennas, the radar device 21 calculates the direction of the object that has reflected the radar waves. Note that if the location and the direction of the object can be calculated, the relative location of the object to the own vehicle can be identified. The radar device 21 transmits the radar waves, receives the reflected waves, and calculates the relative location and the relative speed of the object to the own vehicle, in each predetermined period of the control cycle. Subsequently, the radar device 21 transmits, to the driver-assistance ECU 10, the calculated relative location and relative speed per unit time.

The imaging device 22 is, for example, a charge-coupled device (CCD) camera, a complementary metal-oxide-semiconductor (CMOS) image sensor, or a near-infrared camera. The imaging device 22 is provided at a predetermined height at the middle in the direction of the vehicle width of the own vehicle. The imaging device 22 captures an image of a region spreading ahead of the vehicle for the predetermined angle range, from a downward view point. The imaging device 22 extracts a feature indicating the presence of the object from the captured image. Specifically, on the basis of luminance information of the captured image, the imaging device 22 extracts an edge feature and performs a Hough Transform on the extracted edge feature. Note that in the Hough Transform, for example, a point on a straight line on which edge features are continuously arranged or a point at which such straight lines intersect at a right angle with each other is extracted. The imaging device 22 extracts the captured image and the feature in each period of the control cycle the same as or different from the radar device 21. Subsequently, the imaging device 22 transmits the result of extracting the feature to the driver-assistance ECU 10.

The vehicle speed sensor 23 is provided on a rotary shaft that transmits power to the wheels of the own vehicle. The vehicle speed sensor 23 detects the speed of the own vehicle on the basis of the number of revolutions of the rotary shaft. Subsequently, the vehicle speed sensor 23 transmits the result of detecting the speed to the driver-assistance ECU 10.

The own vehicle includes a warning device 31, a braking device 32, etc., as various safety devices that are driven according to a control command from the driver-assistance ECU 10.

The warning device 31 is, for example, a speaker or a display installed in the interior of the own vehicle. When the driver-assistance ECU 10 determines that there is a possibility of collision with the object, the warning device 31 informs the driver of a risk of collision by outputting a warning sound, a warning message, etc., on the basis of the control command from the driver-assistance ECU 10.

The braking device 32 is a braking device that brakes the own vehicle. When the driver-assistance ECU 10 determines that there is a possibility of collision with the object, the braking device 32 is actuated on the basis of a control command from the driver-assistance ECU 10. Specifically, the braking device 32 increases braking force applied through a braking operation of the driver or automatically puts a brake if the driver does not perform the braking operation, for example. In other words, the braking device 32 provides, for example, a brake assistance function or an automatic brake function for the driver.

The functional units of the driver-assistance ECU 10 will be described. The object recognition unit 11 according to the present embodiment obtains first sensing information (the result of calculating the location) from the radar device 21. Furthermore, the object recognition unit 11 obtains second sensing information (the result of extracting the feature) from the imaging device 22. Subsequently, the object recognition unit 11 associates first location information indicated by the location obtained from the first sensing information and second location information indicated by the feature obtained from the second sensing information as follows. The object recognition unit 11 associates such information that is close in location as location information of the same object. When the location indicated in the second location information is present close to the location indicated in the first location information, the object is likely to actually present at the location indicated in the first location information. A "fusion state" is defined as a state in which the location of the object can be obtained with accuracy by the radar device 21 and the imaging device 22 as just described. Regarding the object determined as being in the fusion state (the object having the first location information and the second location information in association), the object recognition unit 11 determines whether or not the object is continuously in the fusion state by referring to a sensing history (the past sensing locations) of the object. As a result, when the object is determined as being continuously in the fusion state, the object recognition unit 11 determines that the object is present at that location. When the object determined as being continuously in the fusion state enters into a state in which the object is not detected, the object recognition unit 11 refers to the sensing history of the object and determines that the object had been present for a certain period of time at the location detected in the past.

The object information acquisition unit 12 according to the present embodiment obtains, on the basis of the first sensing information (the first location information) obtained from the object recognition unit 11, the relative location and the relative speed to the own vehicle, and associates the obtained relative location and relative speed (of each object) as object information. This relative location includes the lateral position of the object which is a relative location thereof to the own vehicle in the lateral direction orthogonal to the travel direction of the own vehicle. Furthermore, the relative location includes the longitudinal position of the object which is a relative location thereof to the own vehicle in the longitudinal direction which is the travel direction of the own vehicle. Note that the longitudinal position indicates a longitudinal distance that is the distance between the own vehicle and the object in the longitudinal direction (the relative distance of the object to the own vehicle in the longitudinal direction). Thus, when the object is a vehicle, the longitudinal position corresponds to an inter-vehicle distance to the own vehicle. Subsequently, on the basis of the obtained object information (relative location and relative speed), the object information acquisition unit 12 calculates the lateral speed of the object which is a relative speed thereof to the own vehicle in the lateral direction orthogonal to the travel direction of the own vehicle. Furthermore, on the basis of the obtained object information, the object information acquisition unit 12 calculates the longitudinal speed of the object which is a relative speed thereof to the own vehicle in the longitudinal direction which is the travel direction of the own vehicle. Moreover, on the basis of the second sensing information (the second location information), the object information acquisition unit 12 calculates an object location (lateral position) in the captured image. Specifically, on the basis of the result of extracting the edge feature, for example, the object information acquisition unit 12 obtains the position of the lateral ends (right and left ends) of the object in the captured image. The object information acquisition unit 12 determines, as the abovementioned object location, the position of the center defined using the obtained position of the lateral ends as a reference. Hereinafter, the abovementioned object location will be referred to as an "image location of the object" for convenience.

The type determination unit 13 according to the present embodiment performs pattern matching on the detected object. Specifically, the type determination unit 13 performs the pattern matching on the second sensing information using pattern data prepared in advance for each type of expected objects. Subsequently, on the basis of the result of the pattern matching, the type determination unit 13 judges whether the detected object is a vehicle or a pedestrian (passerby), and associates the result of the judgement as the type of the object. Note that the vehicle herein may include not only an automobile having four or more wheels, but also a vehicle having a width greater than or equal to a predetermined value. Specifically, the vehicle according to the present embodiment may include, for example, a towed vehicle, a three-wheeled automobile, a motorcycle with a sidecar, and a carriage. Furthermore, a two-wheeler, a three-wheeler, or the like may also be included. Moreover, in the present embodiment, the concept of a pedestrian may include a cyclist.

Furthermore, the type determination unit 13 subdivides the type of the object on the basis of the result of the judgment of the object and the calculated relative speed (longitudinal speed and lateral speed). For example, when the type of the object is judged as a vehicle, the type of the vehicle can be subdivided as follows. The type determination unit 13 classifies the type of the vehicle into four categories on the basis of the speed of the own vehicle and the lateral speed and longitudinal speed of the vehicle. Specifically, the categories include a preceding vehicle running ahead of the own vehicle in the travel direction thereof, in the same direction as the own vehicle, and an oncoming vehicle running ahead of the own vehicle in the travel direction thereof, in the direction opposite to the travel direction of the own vehicle (running in the opposite lane). Furthermore, the categories include a stationary vehicle (stopped vehicle or parked vehicle) not in motion ahead of the own vehicle in the travel direction thereof, and a passing vehicle crossing in front of the own vehicle crossing the forward travel direction of the own vehicle.

When the type of the object is judged as a pedestrian, the type of the pedestrian can be subdivided as follows. The type determination unit 13 classifies the type of the pedestrian into four categories on the basis of the speed of the own vehicle and the lateral speed and longitudinal speed of the pedestrian. Specifically, the categories include a preceding pedestrian walking ahead of the own vehicle in the travel direction thereof, in the same direction as the own vehicle, and an oncoming pedestrian walking ahead of the own vehicle in the travel direction thereof, in the direction opposite to the travel direction of the own vehicle. Furthermore, the categories include a stationary pedestrian not in motion ahead of the own vehicle in the travel direction thereof, and a crossing pedestrian crossing in front of the own vehicle crossing the forward travel direction of the own vehicle.

The object detected in the first sensing information alone can be subdivided as follows. The type determination unit 13 classifies the type of the object into four categories on the basis of the speed of the own vehicle and the longitudinal speed of the object. Specifically, the categories include a preceding object moving ahead of the own vehicle in the travel direction thereof, in the same direction as the own vehicle, and an oncoming object moving ahead of the own vehicle in the travel direction thereof, in the direction opposite to the travel direction of the own vehicle. Furthermore, the categories include a stationary object not in motion ahead of the own vehicle in the travel direction thereof, and a passing object crossing in front of the own vehicle crossing the forward travel direction of the own vehicle.

The TTC calculation unit 14 according to the present embodiment calculates time to collision which is time for the own vehicle to collide with an object. In other words, the TTC calculation unit 14 calculates, as the time to collision, time estimated for the relative distance of the object to the own vehicle (when the object is a vehicle, the inter-vehicle distance to the own vehicle) to reach zero. Specifically, the TTC calculation unit 14 calculates the time to collision by dividing the relative distance of the object to the own vehicle by the relative speed of the object to the own vehicle. Note that in the calculation of the time to collision, the relative acceleration of the object to the own vehicle may be used. In this case, the time to collision is calculated assuming that the own vehicle and the object come close to each other in linear motion with constant acceleration.

The limit value setting unit 15 according to the present embodiment sets a limit value that is a value indicating a region width in the lateral direction orthogonal to the travel direction of the own vehicle. The limit value defines the width of a determination region (determination region width) for determining whether or not the object is present in the traveling path of the own vehicle. Thus, when the lateral position of the object is within the determination region (within the limit value), the driver-assistance ECU 10 determines, by the presence determination unit 16 to be described later, that the object is present in the traveling path of the own vehicle. This limit value will be described with reference to FIG. 2. Note that in FIG. 2, the lateral direction orthogonal to the travel direction of an own vehicle 40 is indicated as an X axis where the right side with respect to the central axis of the own vehicle 40 is defined as positive. Furthermore, the longitudinal direction that is the travel direction of the own vehicle 40 is indicated as a Y axis where the forward direction of the own vehicle 40 is defined as positive. The Y axis is a straight line passing through the center of the own vehicle 40. Therefore, the Y axis corresponds to the central axis of the own vehicle 40. The limit value setting unit 15 sets, on the basis of a right-side limit value XR, a limit value for defining the determination region width in the direction to the right of the traveling path of the own vehicle 40. Furthermore, the limit value setting unit 15 sets, on the basis of a left-side limit value XL, a limit value for defining the determination region width in the direction to the left of the traveling path of the own vehicle 40. Thus, on the basis of the right-side limit value XR and the left-side limit value XL, the limit value setting unit 15 sets a determination region such as that illustrated in FIG. 2, ahead of the own vehicle 40 in the travel direction thereof. As a result, the set determination region has a predetermined lateral width based on the right-side limit value XR in the direction to the right of the central axis of the own vehicle 40, ahead in the travel direction thereof. Furthermore, the set determination region has a predetermined lateral width based on the left-side limit value XL in the direction to the left ahead in the travel direction. Note that the right-side limit value XR and the left-side limit value XL are predetermined values for each type of an object 50. Thus, the limit value setting unit 15 sets the right-side limit value XR and the left-side limit value XL on the basis of the type of the object 50. When there are a plurality of objects 50, the right-side limit value XR and the left-side limit value XL are set for each object 50.

Figure 2:
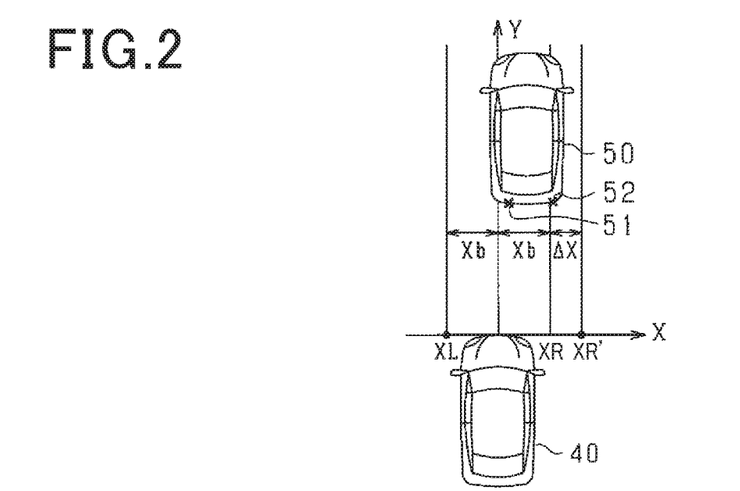
FIG. 2 a diagram illustrating a process of correcting a limit value to a larger value (process of extending a determination region width) in the first embodiment.

For example, when the object 50 is a vehicle, the vehicle has a width (vehicle width) greater than or equal to a predetermined value in the horizontal direction. Therefore, as illustrated in FIG. 2, there are variations in the lateral position of relative locations 51 and 52 of the object 50 to the own vehicle 40, which is detected by the radar device 21 (relative locations in the lateral direction based on the points of reflection that are the result of the detection). At this time, it is assumed that control determines whether or not the object 50 is present in the traveling path of the own vehicle 40 on the basis of the lateral position of the relative location 52 indicating a position near the right rear end of the object 50 which is present in the direction to the right of the central axis (Y axis) ahead of the own vehicle 40 in the travel direction thereof. In this case, even though the object 50 is actually present in the traveling path of the own vehicle 40, the object 50 is determined to be not present in the traveling path of the own vehicle 40 because the lateral position of the relative location 52 is outside the determination region (out of the range of the right-side limit value XR). As a result, there may occur an actuation failure which is a situation in which the safety device is not actuated even when there is a risk of collision that is due to the relative distance of the object 50 to the own vehicle 40 (when the object 50 is a vehicle, the inter-vehicle distance to the own vehicle 40) being less than a predetermined distance (less than a predetermined value).

Thus, when the object 50 is a vehicle and the relative distance thereof (inter-vehicle distance) to the own vehicle 40 is less than the predetermined distance, the limit value setting unit 15 corrects the limit value for the determination region to a larger value and performs the process of extending the determination region width. Specifically, the limit value setting unit 15 performs the following processing (process of extending the determination region width) on the limit value. First, assume that each of the right-side limit value XR and the left-side limit value XL at a normal time is a reference value Xb. There are cases where when the object 50 is a vehicle and the relative distance (inter-vehicle distance) thereof to the own vehicle 40 is less than the predetermined distance, the limit value setting unit 15 corrects the limit value to a value larger than that at a normal time by adding, to the reference value Xb, a correction value ΔX indicating a width to be extended (which may be hereinafter referred to as "extension correction"). At this time, the limit value setting unit 15 determines whether or not the image location of the object 50 is present to the right or the left of the central axis (Y axis) of the own vehicle 40, ahead of the own vehicle 40 in the travel direction thereof. As a result, the limit value setting unit 15 performs the abovementioned correction on the limit value on the side on which the object 50 is determined as being present (located), and sets the corrected limit value as an update, thereby expanding the determination region (performing the extension process). FIG. 2 illustrates a processing example (an example of the process of extending the determination region width) for correcting the right-side limit value XR to a larger value when the object 50 is determined as being located to the right of the central axis of the own vehicle 40. In such a case, the limit value setting unit 15 calculates a right-side limit value XR' which is a value after correction by adding the correction value ΔX to the right-side limit value XR (XR'=XR+ΔX), and sets the right-side limit value XR' as a new limit value. Thus, the driver-assistance ECU 10 can accurately determine whether or not the object 50 is present in the traveling path of the own vehicle 40.

The presence determination unit 16 according to the present embodiment determines, on the basis of the lateral position of the object 50 and the limit value for the determination region, whether or not the object 50 is present in the traveling path of the own vehicle 40. First, the presence determination unit 16 compares the lateral position of the object 50 and the right-side limit value XR and the left-side limit value XL set by the limit value setting unit 15. As a result, when the lateral position of the object 50 is within the range of the determination range (within the range of the limit value), the presence determination unit 16 assumes that the lateral position is inside the determination region (included in the range of the limit value) and determines that the object 50 is present in the traveling path of the own vehicle 40. On the other hand, when the lateral position of the object 50 is outside the range of the determination region (out of the range of the limit value), the presence determination unit 16 assumes that the lateral position is outside the determination region (out of the range of the limit value) and determines that the object 50 is not present in the traveling path of the own vehicle 40. Specifically, in the case where the lateral position of the object 50 is present in the direction to the right of the central axis of the own vehicle 40, when the absolute value of the lateral position is less than the right-side limit value XR, the presence determination unit 16 determines that the lateral position is within the range of a right-side determination region (within the range of the right-side limit value XR). On the other hand, in the case where the lateral position of the object 50 is present in the direction to the left of the central axis of the own vehicle 40, when the absolute value of the lateral position is less than the left-side limit value XL, the presence determination unit 16 assumes that the lateral position is within the range of a left-side determination region (within the range of the left-side limit value XL).

The actuation determination unit 17 according to the present embodiment determines, on the basis of predetermined actuation timing and the calculated time to collision, whether or not to actuate the safety device. First, the actuation determination unit 17 compares preset actuation timing of the safety device and the time to collision calculated by the TTC calculation unit 14. With this, the actuation determination unit 17 determines whether or not the time to collision has reached the actuation timing (whether or not the time to collision is less than or equal to the actuation timing). As a result, when the time to collision has reached the actuation timing (when the time to collision is less than or equal to the actuation timing), the actuation determination unit 17 determines that the safety device is to be actuated. On the other hand, when the time to collision has not reached the actuation timing (the time to collision is greater than the actuation timing), the actuation determination unit 17 determines that the safety device is not to be actuated. When determining that the safety device is to be actuated, the actuation determination unit 17 transmits a determination result (actuation determination signal) to the control processing unit 18 and gives an instruction for control of the safety device to be actuated. Note that the actuation timing for the safety device is preset for each safety device, such as the warning device 31 and the braking device 32, for example. Specifically, for the warning device 31, for example, actuation timing earlier than other safety devices is set. This is because, if the driver is alerted by the warning device 31, notices the possibility of collision, and steps on the brake pedal, collision can be avoided without the driver-assistance ECU 10 giving a control command to the braking device 32. In the braking device 32, the actuation timing is set for each of the brake assistance function and the automatic brake function of the braking device 32. Note that the actuation timing for these may have the same value or may have different values.

The control processing unit 18 according to the present embodiment performs actuation control of the safety device. On the basis of the determination result received from the actuation determination unit 17, the control processing unit 18 transmits a control signal to the safety device to be actuated. With this, the safety device is actuated. In this way, in the driver-assistance ECU 10, the actuation determination unit 17 and the control processing unit 18 cooperate to control the actuation of the safety device.

Figure 3:
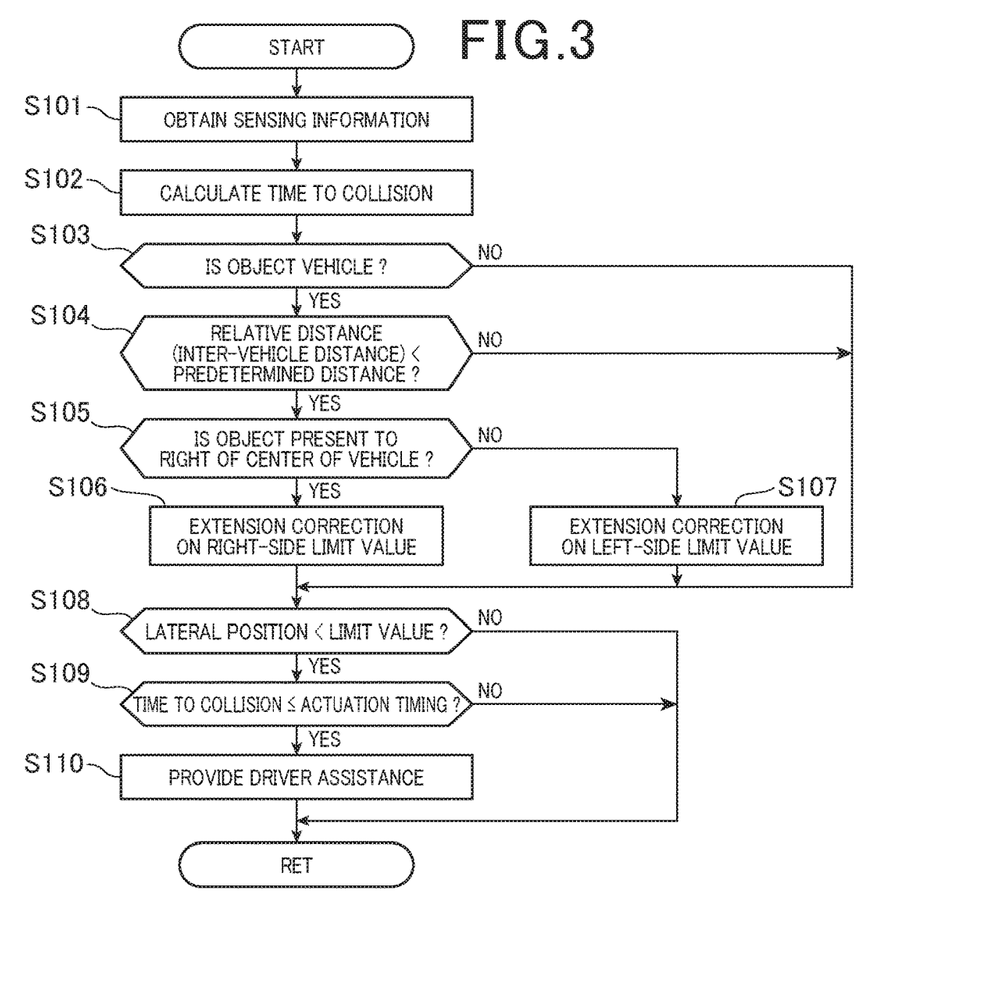
FIG. 3 is a flowchart illustrating a process which a vehicle control device performs in the first embodiment.

A series of processes performed by the driver-assistance ECU 10 according to the present embodiment will be described with reference to FIG. 3. The processes illustrated in FIG. 3 are performed for each object 50 present ahead of the own vehicle 40 in the travel direction thereof, in each predetermined period of the control cycle. Furthermore, these processes are performed for each function of the safety device. Note that the control cycle of these processes may be the same as or different from the control cycle for the radar device 21 and the imaging device 22.

First, in the driver-assistance ECU 10, the object recognition unit 11 obtains sensing information (detected location value) from the radar device 21 and the imaging device 22 (S101). At this time, the driver-assistance ECU 10 performs the following processing by the object information acquisition unit 12 and the type determination unit 13. The object information acquisition unit 12 calculates, on the basis of the first sensing information (the result of calculating the location) from the radar device 21 and the second sensing information (the result of extracting the feature) from the imaging device 22, a relative location (lateral and longitudinal positions) and a relative speed (lateral and longitudinal speeds) of the object 50 to the own vehicle 40. The type determination unit 13 performs pattern matching on the object 50 and determines the type on the basis of the results. Subsequently, in the driver-assistance ECU 10, the TTC calculation unit 14 calculates time to collision which is time estimated for the own vehicle 40 to collide with the object 50 (S102). In the driver-assistance ECU 10, the limit value setting unit 15 determines whether or not the object 50 is a vehicle (S103). At this time, the limit value setting unit 15 determines, on the basis of the result of the determination by the type determination unit 13, whether or not the object 50 is a vehicle. When the object 50 is a vehicle (S103: YES), the limit value setting unit 15 determines whether or not the relative distance (inter-vehicle distance) to the own vehicle 40 is less than a predetermined distance (less than a predetermined value) (S104). When the relative distance (inter-vehicle distance) to the own vehicle 40 is less than the predetermined distance (S104: YES), the limit value setting unit 15 determines whether the object 50 is present to the right or left of the central axis of the own vehicle 40 (S105).

At this time, the determination by the limit value setting unit 15 is based on the image location of the object 50. As a result, when determining that the object 50 is present to the right of the central axis of the own vehicle 40 (S105: YES), the limit value setting unit 15 corrects the right-side limit value XR for the determination region to a larger value (extension correction) (S106). At this time, the limit value setting unit 15 corrects the right-side limit value XR to a value larger than that at a normal time by adding the correction value ΔX to the right-side limit value XR. On the other hand, when determining that the object 50 is present to the left of the central axis of the own vehicle 40 (S105: NO), the limit value setting unit 15 corrects the left-side limit value XL for the determination region to a larger value (extension correction) (S107). In this way, the limit value setting unit 15 performs the abovementioned correction on the limit value on the side on which the object 50 is determined as being located, and sets the corrected limit value as an update, thereby expanding the determination region for determining whether or not the object 50 is present in the traveling path of the own vehicle 40.

Note that when the object 50 is not a vehicle (S103: NO), the driver-assistance ECU 10 does not perform the extension correction on the right-side limit value XR and the left-side limit value XL (process of extending the determination region width) and assumes that each of the right-side limit value XR and the left-side limit value XL is the reference value Xb. This is also true for the case where the relative distance (inter-vehicle distance) to the own vehicle 40 is determined as being greater than a predetermined distance (greater than a predetermined value) (S104: NO). The reason why the extension correction on the limit value (process of extending the determination region width) is not performed in the abovementioned cases is as follows. The case where the process of expanding the determination region is necessary is the case where the relative distance of the object 50 to the own vehicle 40 is short and there is a need to perform control to avoid collision between the own vehicle 40 and the object 50 (the case where there is a need to make the presence of the object 50 be easily determined). Therefore, if the extension correction is performed on the limit value when the process of expanding the determination region is not necessary, there is a possibility that the presence of the object 50 is determined more than necessary (excessively). Thus, unnecessary extension processes cause unnecessary actuation of the safety device. Note that although not illustrated in FIG. 3, when the object 50 is present on a line extended from the central axis of the own vehicle 40, the limit value setting unit 15 may perform the extension correction on both limit values, i.e., the right-side limit value XR and the left-side limit value XL, to extend the determination region width to both the right and left. Furthermore, in the case where the object 50 is present on the central axis of the own vehicle 40, even when there are variations in the result of the detection (points of reflection) of the object 50 by the radar device 21, there is no need to perform the extension correction on the limit value (process of extending the determination region width). This is because the lateral position of the object 50 obtained on the basis of the result of the detection of the object 50 is not likely to be out of the determination region (out of the range of the limit value).

Subsequently, in the driver-assistance ECU 10, the presence determination unit 16 compares the lateral position of the object 50 and the limit value of the determination region to determine whether or not the lateral position is within the range of the limit value (within the range of the determination region) (S108). At this time, when the lateral position of the object 50 is within the range of the limit value, the presence determination unit 16 assumes that the lateral position is inside the determination region and determines that the object 50 is present in the traveling path of the own vehicle 40. On the other hand, when the lateral position of the object 50 is out of the range of the limit value, the presence determination unit 16 assumes that the lateral position is outside the determination region and determines that the object 50 is not present in the traveling path of the own vehicle 40. In the driver-assistance ECU 10, when the presence determination unit 16 determines that the lateral position of the object 50 is within the range of the limit value (S108: YES), the actuation determination unit 17 determines whether or not the calculated time to collision is less than or equal to the actuation timing (S109). At this time, in the case where the time to collision is less than or equal to the actuation timing (the time to collision is shorter than the actuation timing), when the time to collision reaches the actuation timing, the actuation determination unit 17 determines that the safety device is to be actuated. On the other hand, in the case where the time to collision is greater than the actuation timing (the time to collision is longer than the actuation timing), when the time to collision has not reached the actuation timing, the actuation determination unit 17 determines that the safety device is not to be actuated. As a result, in the driver-assistance ECU 10, when the actuation determination unit 17 determines that the time to collision is less than or equal to the actuation timing (the time to collision has reached the actuation timing) (S109: YES), the control processing unit 18 actuates the safety device to provide driver assistance (S110). At this time, the actuation determination unit 17 transmits the result of the determination (actuation determination signal) to the control processing unit 18, and the control processing unit 18 transmits, on the basis of the received result of the determination, a control signal to the safety device to be actuated. With this, the safety device is actuated. On the other hand, when the actuation determination unit 17 determines that the time to collision is greater than the actuation timing (the time to collision has not reached the actuation timing) (S109: NO), the driver-assistance ECU 10 ends the series of processes. In addition, when the presence determination unit 16 determines that the lateral position of the object 50 is not within the range of the limit value (out of the range of the limit value) (S108: NO), the driver-assistance ECU 10 ends the series of processes as well.

With the abovementioned configuration, the vehicle control device (driver-assistance ECU 10) according to the present embodiment produces the following effects.

For example, when the object 50 is a vehicle, the vehicle has a width (vehicle width) greater than or equal to a predetermined value in the horizontal direction. In this case, there are variations in the lateral position of the object 50 which is detected by the radar device 21 (relative locations in the lateral direction based on the points of reflection that are the result of the detection). At this time, assume that whether or not the object 50 is present in the traveling path of the own vehicle 40 is determined on the basis of the varying lateral position. In this case, there is a possibility that the object 50 present in the traveling path of the own vehicle 40 is determined as not being present in the traveling path of the own vehicle 40. As a result, in the case where the safety device is actuated on the basis of the abovementioned result of the determination, there may occur the actuation failure which is a situation in which the safety device is not actuated even when there is a risk of collision. Thus, when the object 50 is a vehicle, the vehicle control device according to the present embodiment increases the limit value (performs the extension correction on the limit value) for the determination region for determining whether or not the object 50 is present in the traveling path of the own vehicle 40, to extend the determination region width (perform the process of extending the determination region width). Accordingly, in the vehicle control device according to the present embodiment, even when there are variations in the lateral position of the object 50 which is detected by the radar device 21, this lateral position falls within the range of the determination region (within the range of the limit value). As a result, with the vehicle control device according to the present embodiment, the presence of the object 50 in the traveling path of the own vehicle 40 is easily determined, and thus the occurrence of the actuation failure of the safety device is reduced.

In the case where the abovementioned process of extending the determination region width (extension correction on the limit value) is performed, the occurrence of the actuation failure of the safety device is reduced, but there may occur unnecessary actuation of the safety device (the situation in which the safety device is actuated when not needed). Specifically, in the case where the determination region width is extended so that the object 50 can be easily determined as being present in the traveling path of the own vehicle 40, there is a possibility that the presence of the object 50 is determined more than necessary (excessively) and the unnecessary actuation of the safety device occurs. Therefore, vehicle control devices require setting of a condition for performing the process of extending the determination region width (extension correction on the limit value) in order to reduce the occurrence of both the actuation failure and the unnecessary actuation of the safety device. Thus, in the vehicle control device according to the present embodiment, the process of extending the determination region width (extension correction on the limit value) is performed only when the relative distance (inter-vehicle distance) to the own vehicle 40 is less than the predetermined distance (less than the predetermined value) and there is a risk of collision (when there is a need to reduce the occurrence of the actuation failure of the safety device). In this way, the vehicle control device according to the present embodiment reduces the occurrence of both the actuation failure and the unnecessary actuation of the safety device.

<Second Embodiment>

Compared to the vehicle control device according to the first embodiment, a vehicle control device according to the present embodiment has the same overall configuration, but is different in part of processing. In the present embodiment, the object information acquisition unit 12, the limit value setting unit 15, and the presence determination unit 16 in the driver-assistance ECU 10 which is the vehicle control device perform the following processing. The object information acquisition unit 12 estimates a motion trajectory of the object 50 and calculates an estimated collision location at which the object 50 is estimated to collide with the own vehicle 40, on the basis of a location history of the object 50. Specifically, the object information acquisition unit 12 calculates, as the estimated collision location, the lateral position in which the relative distance (inter-vehicle distance) between the own vehicle 40 and the object 50 reaches zero. Subsequently, the presence determination unit 16 compares the estimated collision location calculated by the object information acquisition unit 12 and the limit value for the determination region, and determines, on the basis of the result of the comparison, whether or not the object 50 is present in the traveling path of the own vehicle 40 and the safety device needs to be actuated.

Figure 4:
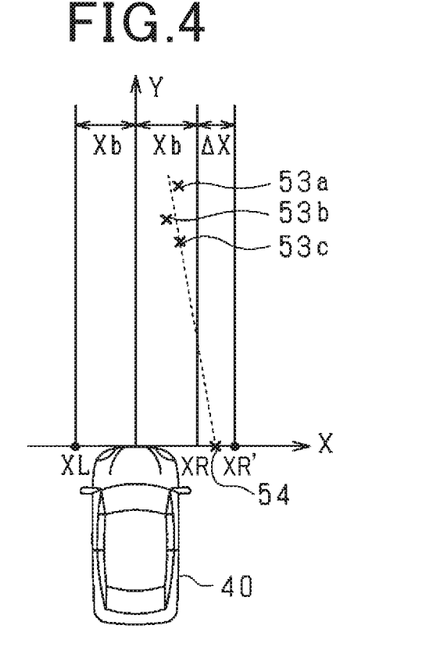
FIG. 4 is a diagram illustrating an estimated collision location in the second embodiment.

The estimated collision location will be described below with reference to FIG. 4. In FIG. 4, a coordinate space similar to that in FIG. 2 is illustrated. Assume, for example, that as illustrated in FIG. 4, the object information acquisition unit 12 obtains relative locations 53a, 53b, and 53c of the object 50 to the own vehicle 40 on the basis of the first sensing information (the first sensing information of the radar device 21) obtained from the object recognition unit 11. At this time, when the own vehicle 40 and the object 50 come close to each other, the relative location 53a, the relative location 53b, and the relative location 53c are obtained in this order. Thus, the relative location 53c is a current location of the object 50, and the relative locations 53a and 53b are the past locations of the object 50. The object information acquisition unit 12 stores the past locations (relative locations 53a and 53b) obtained in this way for a predetermined period of time, and records them as a location history of the object 50. Subsequently, the object information acquisition unit 12 estimates the motion trajectory of the object 50 on the basis of the past locations (relative locations 53a and 53b) of the object 50 recorded as the location history and the current location (relative location 53c) of the object 50. At this time, the object information acquisition unit 12 calculates an approximate straight line using the relative locations 53a, 53b, and 53c, and estimates the motion trajectory of the object 50 by assuming the calculated approximate straight line as the motion trajectory of the relative location of the object 50 to the own vehicle 40. At this time, the motion trajectory to be estimated may be an approximate straight line passing through the relative location 53c which is the current location of the object 50. Subsequently, the object information acquisition unit 12 assumes that the object 50 will move along the estimated motion trajectory (the calculated approximate straight line). Accordingly, the object information acquisition unit 12 calculates, as the estimated collision location 54, the lateral position of the object 50 on the approximate straight line in which the longitudinal position (relative distance) of the object 50 with respect to the front end of the own vehicle 40 reaches zero.

At this time, as described in the first embodiment, when the object 50 is a vehicle, there are variations in the lateral position of the relative locations 53a, 53b, and 53c of the object 50 to the own vehicle 40. Assume that at this time, an approximate straight line indicating a motion trajectory of the object 50 is calculated on the basis of a varying lateral position, and the estimated collision location 54 is calculated in accordance with the calculated approximate straight line. In this case, as illustrated in FIG. 4, even though the object 50 is actually present in the traveling path of the own vehicle 40, the estimated collision location 54 may be outside the determination region (out of the range of the right-side limit value XR). As a result, the object 50 is determined to be not present in the traveling path of the own vehicle 40, and there may occur the actuation failure of the safety device even though there is a risk of collision. Thus, in the vehicle control device according to the present embodiment, similar to the first embodiment, when the object 50 is a vehicle, the limit value setting unit 15 performs the process of extending the determination region width (XR'=XR+ΔX) by increasing the limit value for the determination region for determining whether or not the object 50 is present in the traveling path of the own vehicle 40 (performs the extension correction on the limit value). Accordingly, in the vehicle control device according to the present embodiment, the estimated collision location 54 falls within the determination region (within the range of the limit value) even when there are variations in the lateral position of the object 50. As a result, with the vehicle control device according to the present embodiment, similar to the first embodiment, the presence of the object 50 in the traveling path of the own vehicle 40 is easily determined, and thus the occurrence of the actuation failure of the safety device is reduced.

<Third Embodiment>

Compared to the vehicle control device according to the first embodiment, a vehicle control device according to the present embodiment has the same overall configuration, but is different in part of the processing. The process of extending the determination region width (extension correction on the limit value) reduces the occurrence of the actuation failure of the safety device. However, the process of extending the determination region width (extension correction on the limit value) may cause the unnecessary actuation of the safety device when the object 50 is not present in the traveling path of the own vehicle 40. Thus, in the present embodiment, in order to reduce the occurrence of unnecessary actuation, whether or not to perform the process of extending the determination region width (extension correction on the limit value) is determined on the basis of an image captured by the imaging device 22.

Figure 5:
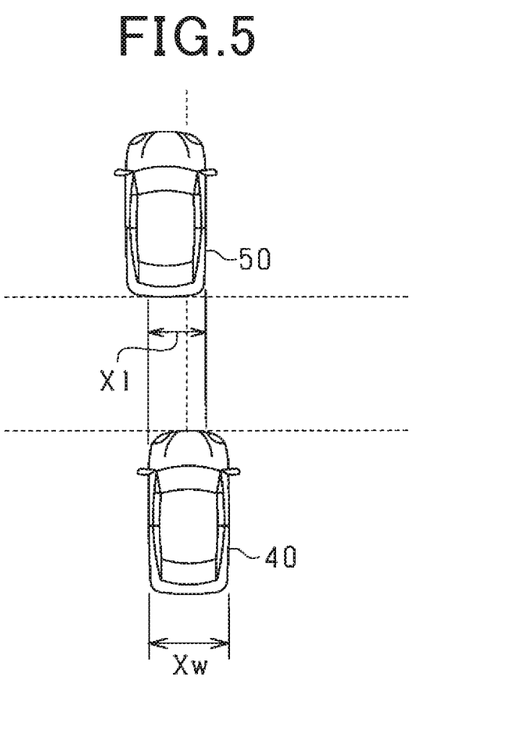
FIG. 5 is a diagram illustrating an overlap ratio in the third embodiment.

In the present embodiment, the object information acquisition unit 12 in the driver-assistance ECU 10 which is the vehicle control device obtains, on the basis of the image captured by the imaging device 22 and obtained by the object recognition unit 11, the position of lateral ends (right and left ends) of the object 50 in the captured image. Subsequently, the object information acquisition unit 12 calculates, on the basis of the obtained position of the lateral ends, an overlap ratio La which is a value indicating the ratio of overlap in width between the own vehicle 40 and the object 50 (inter-vehicle width when the object 50 is a vehicle). This overlap ratio La will be described with reference to FIG. 5. For example, assume that Xw represents the width of the own vehicle 40 and Xl represents the width of a region in which the width of the own vehicle 40 and the width of the object 50 overlap. In this case, the object information acquisition unit 12 calculates the overlap ratio La with the following equation (1).

$$La=Xl/Xw \quad (1)$$

As illustrated in FIG. 5, for example, as the overlap ratio La increases (as the overlap ratio between the width of the own vehicle 40 and the width of the object 50 increases), avoiding collision is more difficult in the event of sudden braking or the like by the object 50. On the other hand, as the overlap ratio La decreases (as the overlap ratio between the width of the own vehicle 40 and the width of the object 50 decreases), avoiding collision is easier in the event of sudden braking or the like because of the object 50.

Thus, there will occur the actuation failure of the safety device in the case where the lateral position of the object 50 varies and falls out of the range of the determination region width (out of the range of the limit value) when the overlap ratio La is greater than a predetermined value (threshold value). Furthermore, there will occur the unnecessary actuation of the safety device in the case where the lateral position of the object 50 varies and falls into the range of the determination region width (into the range of the limit value) through the process of extending the determination region width (extension correction on the limit value) when the overlap ratio La is less than the predetermined value (threshold value).

Thus, in the vehicle control device according to the present embodiment, the limit value setting unit 15 performs the process of extending the determination region width by increasing the limit value (performing extension correction on the limit value) for the determination region for determining whether or not the object 50 is present in the traveling path of the own vehicle 40 in the case where the overlap ratio La is greater than the predetermined value. As the predetermined value (threshold value) which is a reference for determining the magnitude of the overlap ratio La, a value of approximately 10%, for example, is set. This is because even an approximately 10% overlap between the width of the own vehicle 40 and the width of the object 50 may lead to collision. Note that although the present embodiment describes the configuration in which the overlap ratio La is used, this is not limited thereto. As another example, the following determination process may be performed. The object information acquisition unit 12 determines whether or not the image location (central position with the lateral ends as a reference) of the object 50 is within the rage of the width of the own vehicle 40. As a result, when the image location of the object 50 is present within the range defined by the width of the own vehicle 40, the limit value setting unit 15 may perform the process of extending the determination region width by increasing the limit value of the determination region. In this way, the vehicle control device according to the present embodiment accurately reduces the occurrence of both the actuation failure and the unnecessary actuation of the safety device.

<Fourth Embodiment>

Assume, for example, that the process of extending the determination region width (extension correction on the limit value) is performed when the object 50 is moving to cut across in front of the own vehicle 40 in the travel direction thereof. In this case, even the object 50 that has passed through the traveling path of the own vehicle 40 is also easily determined as being present in the traveling path of the own vehicle 40, and thus there is a possibility that the presence of the object 50 is determined more than necessary (excessively) and the unnecessary actuation of the safety device may occur.

Furthermore, assume, for example, that the process of extending the determination region width (extension correction on the limit value) is performed when collision between the own vehicle 40 and the object 50 is avoided by a steering operation. In this case, even the object 50 that has evaded collision is also easily determined as being present in the traveling path of the own vehicle 40, and thus, similar to the abovementioned case, the unnecessary actuation of the safety device may occur. Note that the motion trajectory of the object 50 with respect to the own vehicle 40 in the case where collision with the object 50 is avoided by the steering operation is similar to that in the case where the object 50 is moving to cross in front of the own vehicle 40 in the travel direction thereof.

Figure 6:
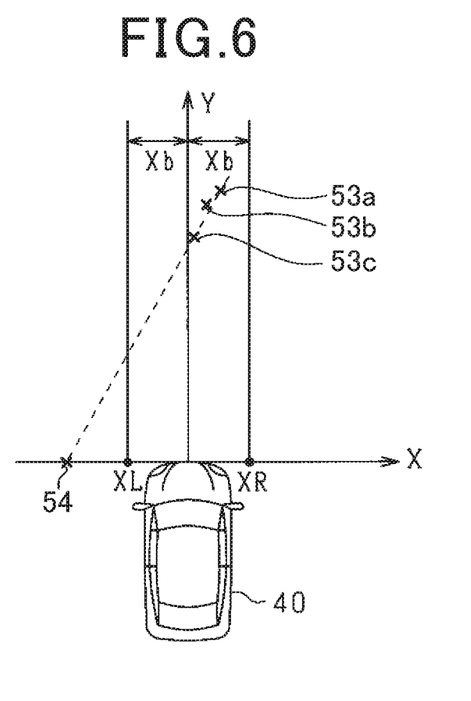
FIG. 6 is a diagram illustrating an estimated collision location in the fourth embodiment.

With reference to FIG. 6, the following will describe the relative location of the object 50 in the case where the object 50 is moving to cut across in front of the own vehicle 40 in the travel direction thereof and in the case where collision between the own vehicle 40 and the object 50 is avoided by a steering operation. In FIG. 6, a coordinate space similar to that in FIG. 4 is illustrated.

In the present embodiment, the object information acquisition unit 12, the limit value setting unit 15, and the presence determination unit 16 in the driver-assistance ECU 10 which is the vehicle control device perform the following processing. Assume, for example, that, as illustrated in FIG.

6, the object information acquisition unit 12 obtains the relative locations 53a, 53b, and 53c of the object 50 to the own vehicle 40 in the case where a vehicle which is the object 50 is crossing in front of the own vehicle 40 crossing the forward travel direction of the own vehicle 40. At this time, in the case where the vehicle which is the object 50 is moving from right to left relative to the travel direction of the own vehicle 40, the relative location 53a, the relative location 53b, and the relative location 53c are obtained in this order. Thus, the relative location 53c is a current location of the object 50, and the relative locations 53a and 53b are the past locations of the object 50. The object information acquisition unit 12 estimates a motion trajectory (calculates an approximate straight line) of the object 50 on the basis of the location history obtained in this way. The object information acquisition unit 12 assumes that the object 50 will move along the estimated motion trajectory (the calculated approximate straight line) and calculates the estimated collision location 54 on the basis of the result of the estimation. At this time, when the line segment connecting the current location (relative location 53c) of the object 50 and the estimated collision location 54 intersects with the traveling path (Y axis) of the own vehicle 40, it is possible to determine that the object 50 is moving to cut across in front of the own vehicle 40 in the traveling path thereof. Alternatively, it is possible to determine that collision between the own vehicle 40 and the object 50 is being avoided by a steering operation by a driver. Thus, in the vehicle control device according to the present embodiment, in such a case, the limit value setting unit 15 does not perform the process of extending the determination region width to increase the limit value (perform the extension correction on the limit value) for the determination region for determining whether or not the object 50 is present in the traveling path of the own vehicle 40.

The motion trajectory of the object 50 is represented by the line segment connecting the current location (relative location 53c) of the object 50 and the estimated collision location 54. Therefore, the vehicle control device according to the present embodiment determines whether or not the current location of the object 50 is present on one of the right and left sides in the lateral direction orthogonal to the travel direction of the own vehicle 40. Furthermore, the vehicle control device determines whether or not the estimated collision location 54 is present on the other side. Subsequently, the vehicle control device according to the present embodiment determines whether or not these conditions are satisfied, and determines, based on the result of the determination, whether or not to perform the process of extending the determination region width (extension correction on the limit value). Thus, the vehicle control device according to the present embodiment accurately reduces the occurrence of unnecessary actuation of the safety device.

Note that although the present embodiment describes the configuration in which whether or not the line segment connecting the current location (relative location 53c) of the object 50 and the estimated collision location 54 intersects with the travel direction of the own vehicle 40 is determined, this is not limited thereto. As another configuration example, whether or not the line connecting the image location of the object 50 and the estimated collision location 54 intersects with the travel direction of the own vehicle 40 may be determined. Alternatively, whether or not the image location of the object 50 and the estimated collision location 54 are respectively present on different sides in the right and left directions.

<Fifth Embodiment>

A vehicle control device according to the present embodiment is different in part of the configuration (functional configuration) from the vehicle control device described in the first embodiment.

Figure 7:
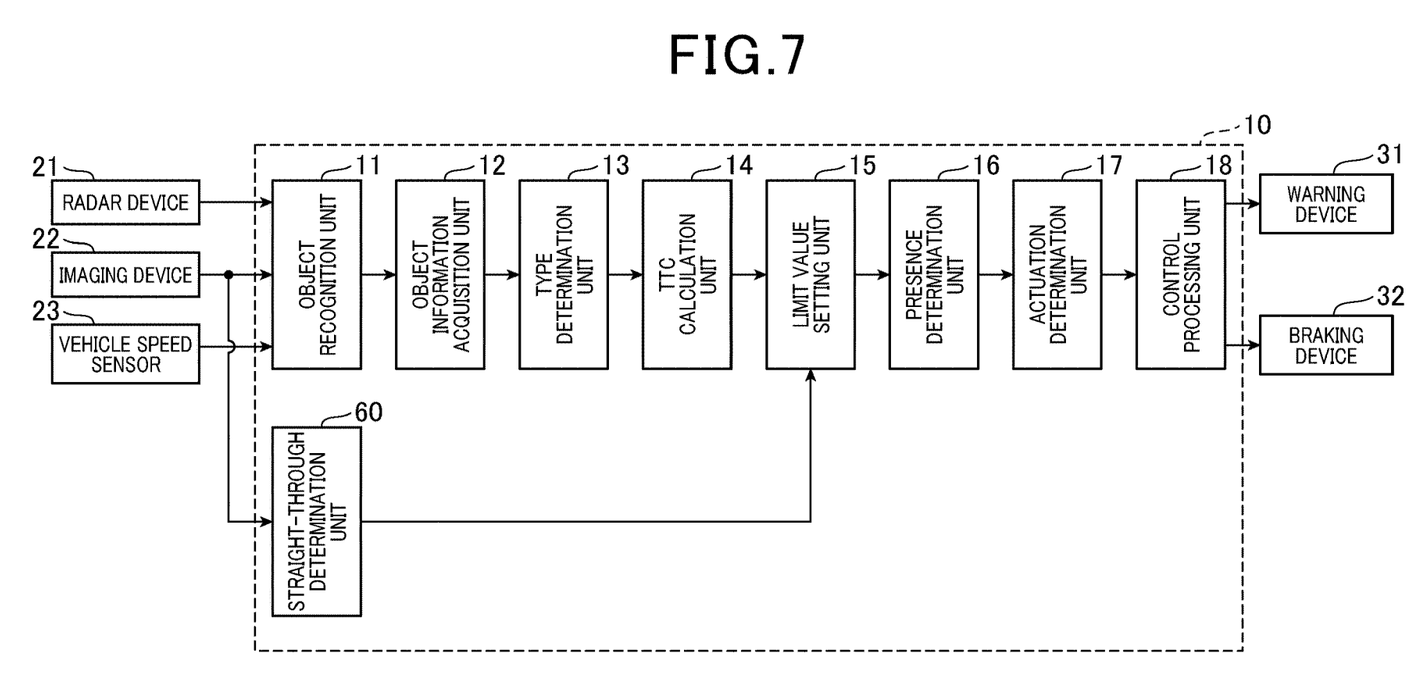
FIG. 7 is a configuration diagram of a vehicle control device according to the fifth embodiment.

FIG. 7 is a configuration diagram of a vehicle control device according to the present embodiment. As illustrated in FIG. 7, the driver-assistance ECU 10 which is the vehicle control device according to the present embodiment further includes a straight-through determination unit 60 which determines whether or not the own vehicle 40 is traveling straight. The straight-through determination unit 60 according to the present embodiment extracts a traffic lane line, such as a white line, drawn on a road from the image captured by the imaging device 22. Subsequently, the straight-through determination unit 60 determines, on the basis of the curvature of the extracted traffic lane line, whether the own vehicle 40 is running in a straight section of the road or running in a curved section of the road.

For example, when the own vehicle 40 is running in a curved section of the road, the object 50 detected ahead of the own vehicle 40 in the travel direction thereof is likely to be not present in the traveling path of the own vehicle 40. Assume that the process of extending the determination region width (extension correction on the limit value) is performed at this time. In this case, even the object 50 that is not present in the traveling path of the own vehicle 40 is also easily determined as being present in the traveling path of the own vehicle 40, and thus there is a possibility that the presence of the object 50 is determined more than necessary (excessively) and the unnecessary actuation of the safety device may occur. Thus, the vehicle control device according to the present embodiment has, as one condition (execution condition) for performing the process of extending the determination region width, a condition that the own vehicle 40 is traveling straight (the driving status of the own vehicle 40 is a straight-through status). Thus, the vehicle control device according to the present embodiment accurately reduces the occurrence of the unnecessary actuation of the safety device.

Note that although the present embodiment describes the configuration in which whether or not the own vehicle 40 is traveling straight (straight-through determination for the own vehicle 40) is determined on the basis of the curvature of the driving lane line, this is not limited thereto. As another configuration example, when the own vehicle 40 is traveling following a preceding vehicle, whether or not the own vehicle 40 is traveling straight may be determined on the basis of the travel trajectory of the preceding vehicle. In yet another configuration, in the case where the own vehicle 40 includes an acceleration sensor, whether or not the own vehicle 40 is traveling straight may be determined on the basis of the result of detection by that acceleration sensor. In yet another configuration, the own vehicle 40 may be determined as traveling straight when these plural determinations are made at the same time as the straight-through determination for the own vehicle 40 and the own vehicle 40 is determined as traveling straight under plural conditions.

<Variations>

In the abovementioned embodiment, whether the image location of the object 50 is present to the right or left of the central axis of the own vehicle 40 is determined, and on the basis of the result of the determination, the determination region width is extended by the extension correction on one of the right-side limit value XR and the left-side limit value XL, but this is not limited thereto. In a modification, the determination region width may be extended by extension correction on both the right-side limit value XR and the left-side limit value XL. Generally, the location information obtained from the image has lower accuracy than the location information obtained from the radar device 21. Therefore, in the modification, when the image location of the object 50 is close to the central axis of the own vehicle 40 (close to the center in the lateral direction with respect to the travel direction), the determination region width may be extended by the extension correction on both the right-side limit value XR and the left-side limit value XL.

Although the abovementioned embodiment describes the configuration in which the first sensing information can be obtained from the radar device 21, this is not limited thereto. In a modification, when the first sensing information cannot be obtained from the radar device 21, the first sensing information in the current period of the control cycle may be estimated using the past first sensing information stored in an earlier period of the control cycle. The lateral position of the object 50 at this time is not a detected value, but an estimated value. Therefore, the accuracy of the lateral position of the object 50 and the estimated collision location 54 calculated using the lateral position is reduced. Thus, in the modification, the determination region width may be extended by the extension correction on the limit value in such a case only.

In the abovementioned embodiment, whether or not the object 50 is a vehicle is determined using the second sensing information from the imaging device 22, but this is not limited thereto. In a modification, whether or not the object 50 is a vehicle may be determined without using the second sensing information from the imaging device 22. As a specific example, first, the first sensing information from the radar device 21 is stored for a predetermined period of time. Subsequently, when locations indicated in the stored first sensing information are sporadically present within a predetermined range in the lateral direction, the first sensing information can be estimated as a sensing result of reflection by a vehicle having a width greater than or equal to a predetermined value in the lateral direction. In this way, the object 50 that corresponds to the first sensing information may be determined as a vehicle. Furthermore, as another example, whether or not the object 50 is a vehicle may be determined on the basis of the reflection intensity of the reflected waves received by the radar device 21. In addition, not only the second sensing information from the imaging device 22, but also the first sensing information from the radar device 21 may be used in such a way that the object 50 is determined as a vehicle when both the first sensing information and the second sensing information indicate that it is a vehicle.

In the abovementioned embodiment, the determination region width is extended by the extension correction of the limit value when the relative distance (inter-vehicle distance) to the own vehicle 40 is less than the predetermined distance (less than the predetermined value), but this is not limited thereto. When the time to collision is less than a predetermined length of time (less than a predetermined value), the occurrence of actuation failure of the safety device needs to be reduced compared to when the time to collision is greater than the predetermined length of time. Thus, in a modification, the determination region width may be extended by the extension correction of the limit value when the time to collision is less than the predetermined length of time. In this case, the abovementioned predetermined length of time (predetermined value) may be set to be greater than every actuation timing of each safety device or may be set to be greater than part of the actuation timing.

Alternatively, the abovementioned predetermined length of time (predetermined value) may be set to be less than every actuation timing of each safety device. Furthermore, not only the relative distance (inter-vehicle distance) to the own vehicle 40, but also the time to collision may be used in such a way that the determination region width may be extended by the extension correction of the limit value when both the relative distance and the time to collision are less than the predetermined values.

In the abovementioned embodiment, the limit value is corrected to a value larger than that at a normal time by using the predetermined correction value ΔX (extension correction is performed), but this is not limited thereto. In a modification, the correction value ΔX may be changed for each function of the safety device. For example, when the warning device 31 is actuated, the driver is likely to notice the risk of collision and perform a steering operation for avoiding the collision. In this case, the actuation of the braking device 32 including the brake assistance function and the automatic brake function is not necessary. Thus, in the modification, the extension correction may be performed on the limit value using the correction value ΔX that is associated with the warning device 31. At this time, the correction value ΔX of the warning device 31 may be changed to a larger value.

As the relative speed of the object 50 to the own vehicle 40 decreases, there is more likely to be modifications in the lateral position of the object 50 that is detected by the radar device 21. Thus, in a modification, as the relative speed of the object 50 to the own vehicle 40 decreases, the correction value ΔX for performing the extension correction of the limit value may be changed to a larger value.

In the abovementioned embodiment, the process of extending the width of the determination region for determining whether or not the object 50 is present in the traveling path of the own vehicle 40 is performed for all of the detected objects 50, but this is not limited thereto. When the object 50 is a preceding vehicle running in the same direction as the own vehicle 40, the relative speed of the preceding vehicle to the own vehicle 40 is low, and the lateral position of the preceding vehicle is likely to vary. Furthermore, when the object 50 is a preceding vehicle, there is a possibility of a sudden slowdown, and therefore the occurrence of the actuation failure of the safety device for such a case needs to be reduced. Thus, in a modification, the process according to the abovementioned embodiment (process of extending the determination region width) may be performed when the object 50 is a preceding vehicle.

When whether or not the object 50 is a vehicle is determined on the basis of the image captured by the imaging device 22, there is a case where the determination is erroneous. In such a case, if the determination region width is extended by the extension correction of the limit value, the unnecessary failure of the safety device may occur. Thus, in a modification, the process of extending the determination region width by the extension correction of the limit value may be performed when the object 50 is continuously determined as a vehicle for a predetermined period of the control cycle on the basis of the image captured by the imaging device 22.

Although the abovementioned embodiment describes the configuration in which the vehicle control device in the present disclosure is applied to a vehicle driven by a person on the vehicle, this is not limited thereto. The vehicle control device in the present disclosure can be applied in the same manner, for example, to a vehicle that is automatically driven by the ECU or the like. In this case, the actuation determination unit 17 and the control processing unit 18 do not function in accordance with the warning device 31 and the brake assistance function of the braking device 32. The actuation determination unit 17 and the control processing unit 18 may be configured to function in accordance with the automatic brake function of the braking device 32.

Although the abovementioned embodiment describes the configuration in which the warning device 31 and the braking device 32 serve as safety devices to be controlled, the safety device to be controlled is not limited to this example.

REFERENCE SIGNS LIST

10 Driver-assistance ECU
11 Object recognition unit
12 Object information acquisition unit
13 Type determination unit
14 TTC calculation unit
15 Limit value setting unit
16 Presence determination unit
17 Actuation determination unit
18 Control processing unit
21 Radar device
22 Imaging device
23 Vehicle speed sensor
40 Own vehicle
50 Object
60 Straight-through determination unit

The invention claimed is:

1. A vehicle control device which obtains, from a radar device that transmits radar waves ahead of an own vehicle in a forward travel direction thereof and receives reflected waves reflected by an object, sensing information of the object based on the reflected waves, the vehicle control device comprising:
   an object information acquisition unit which obtains, on the basis of the sensing information, a relative distance of the object to the own vehicle in a travel direction of the own vehicle and a lateral position that is a relative location of the object to the own vehicle in a lateral direction orthogonal to the travel direction of the own vehicle;
   a type determination unit which determines whether or not the object is a vehicle;
   a limit value setting unit which sets a limit value indicating a determination region width in the lateral direction orthogonal to the forward travel direction of the own vehicle, for a determination region for determining whether or not the object is present in a traveling path of the own vehicle; and
   a presence determination unit which determines, on the basis of the lateral position and the limit value, whether or not the object is present in the traveling path of the own vehicle, wherein
   the limit value setting unit performs an extension process of extending the determination region width by correcting the limit value to a larger value when the object is the vehicle and the relative distance is less than a predetermined distance than when the object is not a vehicle.

2. A vehicle control device which obtains, from a radar device that transmits radar waves ahead of an own vehicle in a forward direction of a travel direction thereof and receives reflected waves that are waves reflected by an object sensing information of the object based on the reflected waves, the vehicle control device comprising:
   an object information acquisition unit which obtains, on the basis of the sensing information, a relative distance of the object to the own vehicle in a travel direction of the own vehicle, a lateral position that is a relative location of the object to the own vehicle in a lateral direction orthogonal to the travel direction of the own vehicle, and a relative speed of the object to the own vehicle;
   a type determination unit which determines whether or not the object is a vehicle;
   a time-to-collision calculation unit which calculates, on the basis of the relative speed and the relative distance, time to collision that is time estimated for a distance between the own vehicle and the object to reach zero;
   a limit value setting unit which sets a limit value indicating a determination region width in the lateral direction orthogonal to the forward direction of the travel direction of the own vehicle, for a determination region for determining whether or not the object is present in a traveling path of the own vehicle; and
   a presence determination unit which determines, on the basis of the lateral position and the limit value, whether or not the object is present in the traveling path of the own vehicle, wherein
   the limit value setting unit performs an extension process of extending the determination region width by correcting the limit value to a larger value when the object is the vehicle and the time to collision is less than a predetermined length of time than when the object is not a vehicle.

3. The vehicle control device according to claim 1, wherein, when a location based on the sensing information is present close to a location based on an image obtained from an imaging device included in the own vehicle, the type determination unit determines, on the basis of the image, whether or not the object is the vehicle.

4. The vehicle control device according to claim 3, wherein
   the object information acquisition unit further obtains an image location that is the location of the object in the image, and
   the limit value setting unit performs the extension process by correcting the limit value on a right side to a larger value when the image location is present to the right of a central axis of the own vehicle, and performs the extension process by correcting the limit value on a left side to a larger value when the image location is present to the left of the central axis of the own vehicle.

5. The vehicle control device according to claim 3, wherein
   the object information acquisition unit further obtains, on the basis of the image, an overlap ratio indicating a ratio of overlap in width between the own vehicle and the object, and
   the limit value setting unit performs the extension process when the overlap ratio is greater than a predetermined value.

6. The vehicle control device according to claim 4, wherein the limit value setting unit performs the extension process when the image location is present in a range defined by a width of the own vehicle.

7. The vehicle control device according to claim 1, wherein the type determination unit determines, on the basis of intensity of the reflected waves received by the radar device, whether or not the object is the vehicle.

8. The vehicle control device according to claim 1, wherein the object information acquisition unit obtains the sensing information for a predetermined period of time, estimates a motion trajectory of the object on the basis of a plurality of pieces of the sensing information obtained, calculates, on the basis of a result of the estimation, a location in the lateral direction in which the relative distance of the object to the own vehicle reaches zero, as an estimated collision location, and sets, as the lateral position, the estimated collision location calculated.

9. The vehicle control device according to claim 8, wherein the limit value setting unit performs the extension process when a current location of the object is present on at least one of right and left sides in the lateral direction orthogonal to the travel direction of the own vehicle and the estimated collision location is present on the other side.

10. The vehicle control device according to claim 1, wherein
the type determination unit further determines whether or not the object is a preceding vehicle that runs in the same direction as the own vehicle, and
the limit value setting unit performs the extension process when the object is the preceding vehicle.

11. The vehicle control device according to claim 1, further comprising
a straight-through determination unit which determines whether or not the own vehicle is traveling straight, wherein
when the own vehicle is determined as traveling straight, the limit value setting unit performs the extension process.

12. A vehicle control method which is performed by a vehicle control device that obtains, from a radar device that transmits a radar waves ahead of an own vehicle in a forward direction of a travel direction thereof and receives reflected waves that are waves reflected by an object, sensing information of the object based on the reflected waves, the vehicle control method comprising the steps of:
obtaining, on the basis of the sensing information, a relative distance of the object to the own vehicle in a travel direction of the own vehicle and a lateral position that is a relative location of the object to the own vehicle in a lateral direction orthogonal to the travel direction of the own vehicle;
determining whether or not the object is a vehicle;
setting a limit value indicating a determination region width in the lateral direction orthogonal to the forward travel direction of the own vehicle, fora determination region for determining whether or not the object is present in a traveling path of the own vehicle;
determining, on the basis of the lateral position and the limit value, whether or not the object is present in the traveling path of the own vehicle, and
controlling the vehicle based on the determining steps, wherein
the setting includes performing an extension process of extending the determination region width by correcting the limit value to a larger value when the object is the vehicle and the relative distance is less than a predetermined distance than when the object is not a vehicle.

13. A vehicle control method which is performed by a vehicle control device that obtains, from a radar device that transmits a radar wave in a forward travel direction of an own vehicle and receives reflected waves that are waves reflected by an object, sensing information of the object based on the reflected waves, the vehicle control method comprising the steps of:
obtaining, on the basis of the sensing information, a relative distance of the object to the own vehicle in a travel direction of the own vehicle, a lateral position that is a relative location of the object to the own vehicle in a lateral direction orthogonal to the travel direction of the own vehicle, and a relative speed of the object to the own vehicle;
determining whether or not the object is a vehicle;
calculating, on the basis of the relative speed and the relative distance, time to collision that is time estimated fora distance between the own vehicle and the object to reach zero;
setting a limit value indicating a determination region width in the lateral direction orthogonal to the forward travel direction of the own vehicle, fora determination region for determining whether or not the object is present in a traveling path of the own vehicle;
determining, on the basis of the lateral position and the limit value, whether or not the object is present in the traveling path of the own vehicle, and
controlling the vehicle based on the determining steps, wherein
the setting includes performing an extension process of extending the determination region width by correcting the limit value to a larger value when the object is the vehicle and the time to collision is less than a predetermined length of time than when the object is not a vehicle.

14. The vehicle control device according to claim 4, further comprising
an object recognition unit which determines, on the basis of a first location obtained from the radar device and a second location obtained from the imaging device, whether or not the object detected by the radar device and the object detected by the imaging device are the same object, wherein
the object information acquisition unit further obtains the image location that is the location of the object in the image, and
when the object is determined as being the same object by the object recognition unit, the limit value setting unit performs the extension process by correcting the limit value on a right side to a larger value when the image location is present to the right of a central axis of the own vehicle, and performs the extension process by correcting the limit value on a left side to a larger value when the image location is present to the left of the central axis of the own vehicle.

15. The vehicle control device according to claim 2, wherein, when a location based on the sensing information is present close to a location based on an image obtained from an imaging device included in the own vehicle, the type determination unit determines, on the basis of the image, whether or not the object is the vehicle.

16. The vehicle control device according to claim 15, wherein
the object information acquisition unit further obtains an image location that is the location of the object in the image, and
the limit value setting unit performs the extension process by correcting the limit value on a right side to a larger value when the image location is present to the right of a central axis of the own vehicle, and performs the extension process by correcting the limit value on a left side to a larger value when the image location is present to the left of the central axis of the own vehicle.

17. The vehicle control device according to claim 15, wherein
the object information acquisition unit further obtains, on the basis of the image, an overlap ratio indicating a ratio of overlap in width between the own vehicle and the object, and
the limit value setting unit performs the extension process when the overlap ratio is greater than a predetermined value.

18. The vehicle control device according to claim 16, wherein the limit value setting unit performs the extension process when the image location is present in a range defined by a width of the own vehicle.

19. The vehicle control device according to claim 2, wherein the type determination unit determines, on the basis of intensity of the reflected waves received by the radar device, whether or not the object is the vehicle.

20. The vehicle control device according to claim 2, wherein the object information acquisition unit obtains the sensing information for a predetermined period of time, estimates a motion trajectory of the object on the basis of a plurality of pieces of the sensing information obtained, calculates, on the basis of a result of the estimation, a location in the lateral direction in which the relative distance of the object to the own vehicle reaches zero, as an estimated collision location, and sets, as the lateral position, the estimated collision location calculated.

21. The vehicle control device according to claim 20, wherein the limit value setting unit performs the extension process when a current location of the object is present on at least one of right and left sides in the lateral direction orthogonal to the travel direction of the own vehicle and the estimated collision location is present on the other side.

22. The vehicle control device according to claim 2, wherein
the type determination unit further determines whether or not the object is a preceding vehicle that runs in the same direction as the own vehicle, and
the limit value setting unit performs the extension process when the object is the preceding vehicle.

23. The vehicle control device according to claim 2, further comprising
a straight-through determination unit which determines whether or not the own vehicle is traveling straight, wherein
when the own vehicle is determined as traveling straight, the limit value setting unit performs the extension process.

24. The vehicle control device according to claim 16, further comprising
an object recognition unit which determines, on the basis of a first location obtained from the radar device and a second location obtained from the imaging device, whether or not the object detected by the radar device and the object detected by the imaging device are the same object, wherein
the object information acquisition unit further obtains the image location that is the location of the object in the image, and
when the object is determined as being the same object by the object recognition unit, the limit value setting unit performs the extension process by correcting the limit value on a right side to a larger value when the image location is present to the right of a central axis of the own vehicle, and performs the extension process by correcting the limit value on a left side to a larger value when the image location is present to the left of the central axis of the own vehicle.

* * * * *